US007891060B2

(12) United States Patent
Ross et al.

(10) Patent No.: US 7,891,060 B2
(45) Date of Patent: Feb. 22, 2011

(54) CLAMP

(75) Inventors: Ralph Barclay Ross, Aberdeen (GB); Bruce Andrew Murray, Aberdeenshire (GB)

(73) Assignee: Muro, Test and Certification UK, Aberdeen (GB)

( * ) Notice: Subject to any disclaimer, the term of this patent is extended or adjusted under 35 U.S.C. 154(b) by 991 days.

(21) Appl. No.: 11/640,685

(22) Filed: Dec. 18, 2006

(65) Prior Publication Data

US 2007/0141922 A1 Jun. 21, 2007

(30) Foreign Application Priority Data

Dec. 21, 2005 (GB) ................................ 0525941.1

(51) Int. Cl.
*F16G 11/04* (2006.01)

(52) U.S. Cl. .................................................... 24/136 R

(58) Field of Classification Search ............... 24/136 R, 24/115 M, 136 B; 188/67, 65.1; 175/423; 166/88.2, 77.51, 77.53
See application file for complete search history.

(56) References Cited

U.S. PATENT DOCUMENTS

| | | | | |
|---|---|---|---|---|
| 1,504,087 | A | 8/1924 | Brady | |
| 2,526,661 | A | 10/1950 | Mariana | |
| 3,467,224 | A | 9/1969 | Curtis et al. | |
| 3,986,583 | A * | 10/1976 | Kinzbach | 188/67 |
| 4,498,563 | A | 2/1985 | Trahan | |

FOREIGN PATENT DOCUMENTS

| | | |
|---|---|---|
| FR | 1 574 238 | 9/1980 |
| GB | 2 214 953 | 9/1989 |
| GB | 0 624 803.3 | 3/2007 |

* cited by examiner

*Primary Examiner*—James R Brittain
(74) *Attorney, Agent, or Firm*—Taft Stettinius & Hollister LLP

(57) ABSTRACT

A clamp for an oil well line is disclosed, the clamp having a casing, typically a pair of wedge members defining a line receiving recess between them and wherein the wedge member are movable within a channel in the casing to move together and grip the line when axial force is applied to the line. The radially outermost faces of the wedge members are typically shaped to match the taper of the channel in the casing, and so are pressed together as they move axially down the tapered channel. One wall of the channel is typically movable to disengage from the wedge member when the gripping force is to be removed. The line-receiving recess can be in the form of an arc or a dog leg, and can be lined with a high friction material or a softer material to minimize damage to the line by the clamping force.

37 Claims, 9 Drawing Sheets

CLAMP

CROSS REFERENCE TO RELATED APPLICATIONS

This application claims the benefit under 35 U.S.C. §119 of United Kingdom Patent Application Serial No. 0525941.1, filed Dec. 21, 2005, and entitled "Clamp," the disclosure of which is incorporated herein by reference.

FIELD OF THE INVENTION

This invention relates to a clamp. The invention particularly relates to a clamp for clamping wire or line in an oil or gas well.

DESCRIPTION OF THE RELATED ART

It is common practice in the art of producing from oil and gas wells to deploy tools and other devices in the well and to suspend them from the surface by means of lines such as wireline or slickline, which are well known in the art. In the case of slickline, the line can be a plain cable, used to suspend and deliver a string of tools to a location in the wellbore. For example, slickline might be used to deliver a plug setting tool to the perforation zone. In the case of wireline, as well as a tensile support for the string, the line can incorporate signal conduits to transfer data back to the surface from well logging tools in the string, and/or power conduits to deliver power to downhole motors and pumps etc. within the string or elsewhere in the wellbore.

Over the years, wells have become deeper and tools have become more numerous and heavier, so the length and load-bearing capacity of wireline and slickline has increased to keep pace. Also, the complexity of the data that is recoverable from wells has also increased, so the lines must now carry more data. Present designs of wireline and slickline are therefore complex items with high capacities for loads and data transfer, and a high value.

When the tool string is run into the hole, the line is typically spooled out under tension from a winch drum. The winch drum might be located at a different location on the rig, and the line typically passes from the drum and over sheaves etc. on the derrick before passing into the hole. When the tool string is to be recovered, the winch drum motor is reversed to pull in the line and recover the string. Occasionally, during this recovery process, the tool string becomes stuck in the hole, for example where the aperture in the casing has narrowed due to scale build up or debris obstructing the hole, and the tool cannot pass back up through the narrowed aperture. Sometimes the winch motor can pull these snagged tool strings free if the tension on the line does not increase above a threshold of, for example, around 60%-70% of the capacity of the line. Above that threshold, breaking and crush damage of the line becomes more likely, and it is unsafe to recover the string by continued rotation of the drum winch, since if the line snaps between the hole and the drum, workers in the surrounding area could be injured. Also, with increasing weights of string, the load of the snagged string is sometimes too heavy for the drum winch motor and/or the sheaves etc. In such cases, clamps are presently used to grip the line just above the hole, and the lifting force is applied to the clamp rather than by the drum motor. This removes the strain from the relatively low capacity sheaves and the drum winch, and also ensures that any breakages of the line occur below the clamp and therefore do not endanger the rig workers to the same extent. Also, the higher rated derrick winch can be used to lift the clamp, applying a higher force than the drum winch.

This approach sometimes frees the snagged string, allowing recovery as normal, but in some cases, the tools are snagged so tightly downhole that they cannot be recovered by pulling on the line, and in those instances, a decision is sometimes taken to clamp the line just above the hole, and pull from the derrick winch to deliberately break the line at a weakened connection pre-installed close to the tool, so that most of the line can be recovered without significant damage. The tool string can then be "fished" by other means.

In present designs of clamps, the line is held between two plates that are bolted together around the line. The bolts (usually 8 or so) are inserted through the plates and tensioned manually to the same torque. This design is time consuming to assemble and prone to slippage, and for this reason multiple clamps are sometimes used in tandem.

INTRODUCTION OF THE INVENTION

According to the present invention there is provided a clamp for an oil well line, the clamp having a casing, and at least one wedge member, the wedge member being movable within a channel in the casing to grip the line when axial force is applied to the line.

Typically, the wedge member has first side that is tapered to match a side of the channel, causing lateral movement of the wedge member when it is axially moved within the channel.

In simple embodiments, only one wedge member is provided, which slides in a tapered channel to move laterally against one side of the channel thereby gripping the line between the wedge member and the channel side. However, in other embodiments two or more wedge members can be provided movable in a radial arrangement with a line-receiving portion between them, and having radially outermost faces that are shaped to match the taper of the channel in the casing.

In the two-wedge embodiment, when the wedge members move axially down the tapered channel, they are pressed together by the tapered sides of the channel, thereby trapping the line between them in the line-receiving portion. As the axial tension on the line increases, thus the line pulls the wedge members further down into the channel, and the lateral gripping force exerted on the line by the wedges increases.

One wall of the channel is typically movable to disengage from the wedge member when the gripping force is to be removed. This can be accomplished by supporting the movable wall by means of threaded members adjustable to back the movable wall away from the line, and thereby allowing lateral movement of the wedge away from the line without any axial component of movement. This helps to disengage the clamp from the line after very high forces have been applied to the line making axial movement of the wedges difficult.

The line-receiving portion can be a bore or a recess, and in some embodiments can be straight with the ends axially aligned with the central section of the recess, and with the direction of force to be applied. In some other embodiments the bore or recess is not straight; for example, a central section of the bore or recess can be displaced from the axis, and optionally the recess can be in the form of an arc or a dog leg, so that while the ends of the recess may be aligned with one another and with the axis of force, at least a part of the central section of the recess can be displaced from the axis. This bend etc allows the wedge members to better grip the line within the bore or recess, and to resist pullout of the line therefrom.

In some embodiments, the walls of the bore or recess are lined, typically with a material that is different from the material of the wedge members. For example, the lining can be a softer material or one that has a different (e.g. higher) frictional coefficient. The lining can be continuous along the recess, or can be intermittent. The lining can be thicker at one end of the recess than at the other end, or can have different properties (e.g. frictional coefficient or hardness) at different ends of the recess.

The walls of the bore or recess can be ridged or toothed to grip the line, and the pattern of ridges or teeth can be different between the bottom and the top of the recess. In certain options, both ridges and teeth can be provided, each (or one of them) having a different pattern between the bottom and the top of the recess. The ridges (and/or teeth) can be formed from a different material than the wedge members. Optionally the ridges are formed from a material with a higher coefficient of friction than the material comprising the wedge members, so that the friction applied to the line by the ridges can be manipulated without affecting the wedges. The material of the ridges can also be softer than the material of the wedges. Typically, the ridges are mounted in recesses in the wedges and project radially from the inner walls of the recess. The ridges can be spaced axially from one another at equal distances along the recess, but in certain embodiments, the spacing between adjacent ridges can be different between the top of the recess and the bottom. In typical embodiments of this type, the ridges are spaced closer together at the top of the recess than at the bottom, so that there are more ridges at the top of the recess than at the bottom. Thus, more surface area of ridge material at the top of the recess is in contact with the line than at the bottom, and this helps to balance the force on the line between the top and bottom of the recess. Also, where the ridges are more compressible than the wedge members, this spacing differential allows manipulation of the compression balance between the top and the bottom of the recess.

The wedge members can be keyed to the casing to restrain movement that is not axial or lateral. For example, rotational movement around the axis of the wedge members can be prevented or restricted by means of splines or keys that engage between the outer face of the wedge members and the inner face of the channel.

The wedges can be pivotally or otherwise engaged with one another, for example, at one end of the recess. Optionally a hook on one of the wedge members engages with a T-shaped bar on the other. Pivotal engagement of the wedge members limits the available range of movement of the members to movement together to grip the line in the recess, and minimises the scope for the members to disengage with one another and lose their grip on the line. In some other embodiments, the wedge members are engaged together by means of a lug and recess that prevent axial movement but which allow radial movement.

In certain embodiments of the invention, the wedge members are biased towards one another by means of springs.

In certain other embodiments, the wedge members may be forced to move within the channel by means of mechanical screw devices, or by pneumatic or hydraulic pressure applied from a source of pressurised air or fluid. In some cases, the wedge members can be pulled downwards into the channel from the top of the channel to the bottom of the channel, in order to rapidly move the wedge members towards one another laterally due to the tapered sides of the channel, and to grip the line between them. The gripping mechanism can optionally be activated by the speed of line movement through the clamp, so that high-speed movement of the line in the recess triggers the closure mechanism in order to rapidly close the wedge members around the line located in the recess, and thereby prevent further movement of the line through the clamp.

In certain embodiments, the clamp can have a movement detector in order to determine the speed and direction of movement of the line through the clamp. Optionally, these can be in the form of rollers at the top or bottom of the clamp, and aligned with the recess, which are pressed together to engage the line as it enters or exits the recess. The direction of rotation of the rollers can give an indication of the direction of movement of the line, and the speed of the rollers can give an indication of the speed of the line through the clamp. In the case of high-speed sudden movement of the line through the recess, this might indicate a breakage of the line above the clamp, and rapid movement of the line through the clamp recess. In that situation, the movement detector can trigger the clamping mechanism in order to force the wedge members together and to grip the line more securely. The trigger can be a simple electronic switch unit, or can comprise a centrifugal arm. One suitable trigger can comprise an encoder that is connected to the axle of a jockey wheel pressed against the line, so that the speed of the line through the clamp drives rotation of the wheel at a designated speed, which is reported to the encoder. The encoder can be set to switch a valve at a present speed and/or direction, for example, 150 m/s in a downwards direction, which is designated as a fast fall of the wire indicative of line breakage. Alternatively the encoder can be set to monitor acceleration and to trigger the switch above a given value of acceleration that is indicative of breakage of the line. The switch can control a pressure line open to the main rig pressure system of 120 psi, which can, upon triggering of the switch, be exposed to a pneumatic piston that is connected between the wedges and the body of the clamp. The piston can be actuated by the exposure to the rig pressure system when the switch is triggered by the encoder, and this can instantaneously close the wedges around the line to prevent further movement through the clamp body. The piston can comprise a pneumatic arm arranged to drive the wedge members axially downwards with respect to the tapering channel, so that they are driven laterally towards one another by the corresponding taper.

In certain embodiments, the pull down feature and the line movement detector can be used to increase the gripping force applied by the wedge members that are actively gripping a line, and this can be useful in the unlikely event of the line slipping through the active clamp.

In certain other embodiments, the pull down feature and the line movement detector can be used to trigger the initial activation of a clamp that is not yet applied to a line, with the wedge members spaced apart from one another and from the line. Such embodiments can be passively connected around it with the line running through the recess. If desired, the line can run freely through the open recess between the spaced apart wedge members while the tool string is being run into the hole, and the rollers can monitor the speed of the line through the casing. If the line speed through the casing suddenly increases above a certain threshold, then the line movement detector can signal the pull down mechanism to trigger the movement of the wedge members together against the line, and thereby to arrest the line within the clamp, in order to capture a line that might have broken above the clamp.

In typical embodiments, the wedge members are axially linked to one another by means of the pivotal connection at the lower end of the recess, and typically also by means of a bar and socket arranged at the top of the recess, such that a reaction force against one of the wedge members to drive it axially downwards in the channel transfers the force to the other wedge member to do likewise.

In certain embodiments, the casing can have padeyes or other strong points to attach lifting devices. In certain other embodiments, the casing can be supported from below and can optionally comprise a seat for engagement with a stool.

In some embodiments, the casing has a slot aligned axially with the recess between the wedge members, so that a line can be passed through the slot into the recess without disassembly of the clamp. Typically, the wedge members are held in the channel by means of plates fastened across a portion of the channel, and leaving an access slot for a line between the plates in the assembled casing.

BRIEF DESCRIPTION OF THE DRAWINGS

An embodiment of the present invention will now be described, by way of example, with reference to the accompanying drawings, in which.

SPECIFIC DESCRIPTION OF ONE OR MORE EMBODIMENTS OF THE INVENTION

Figure 1:
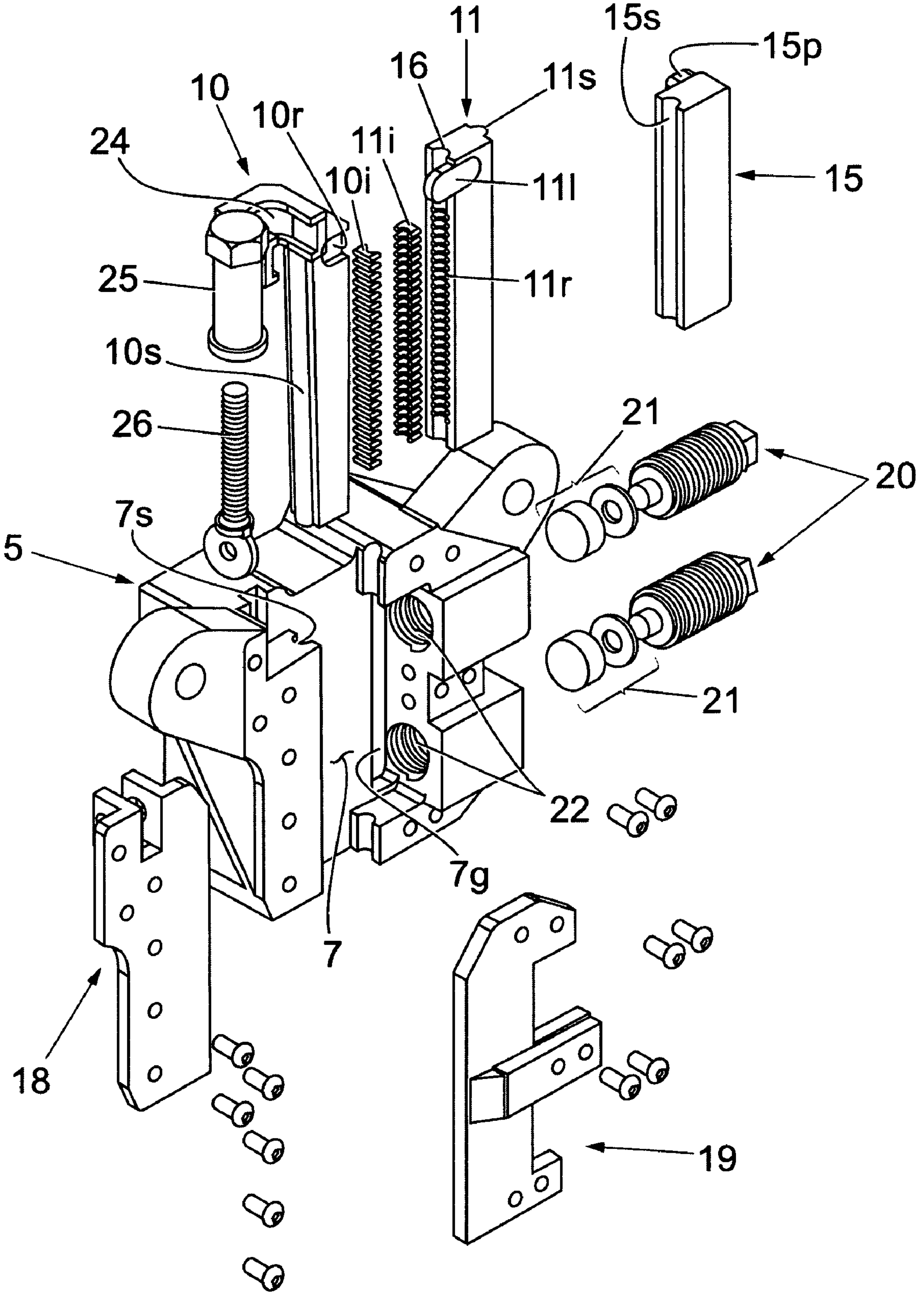
FIG. 1 shows a perspective exploded view of a clamp according to the invention.
Figure 2:
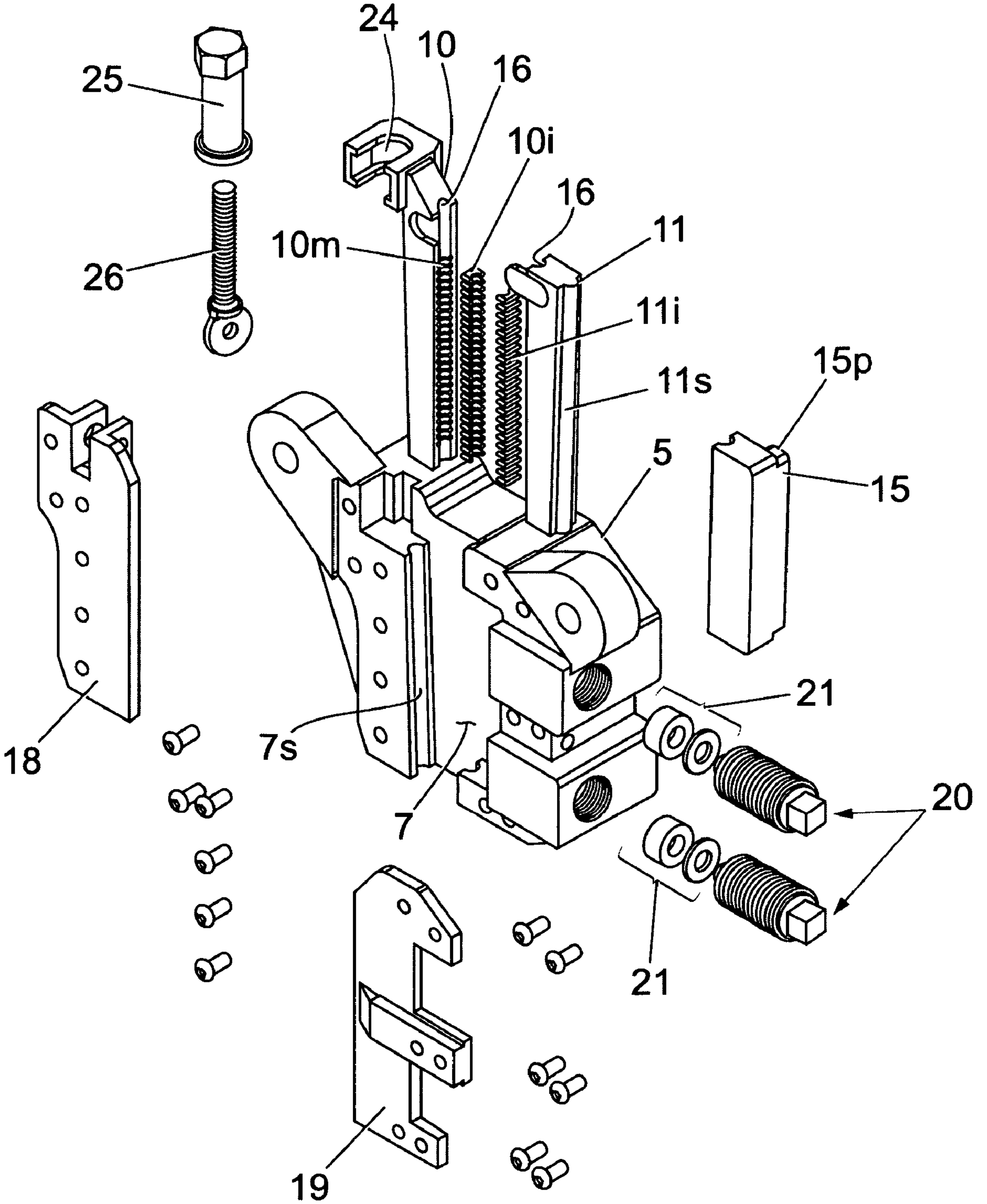
FIG. 2 shows a perspective view of the FIG. 1 clamp, from the other side.
Figure 3:
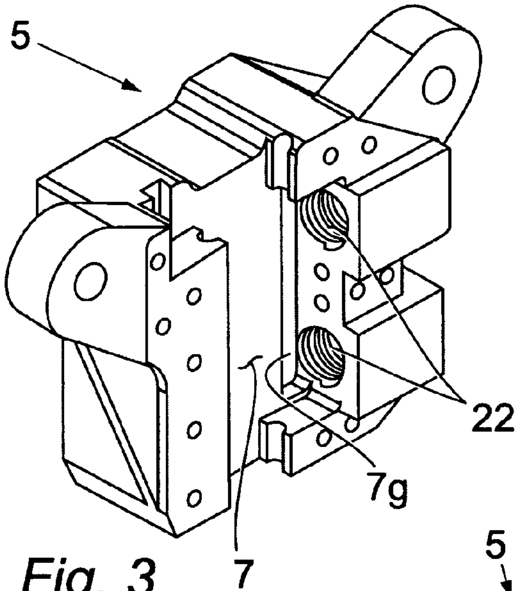
FIG. 3 shows a perspective view of the casing of the FIG. 1 clamp.
Figure 4:
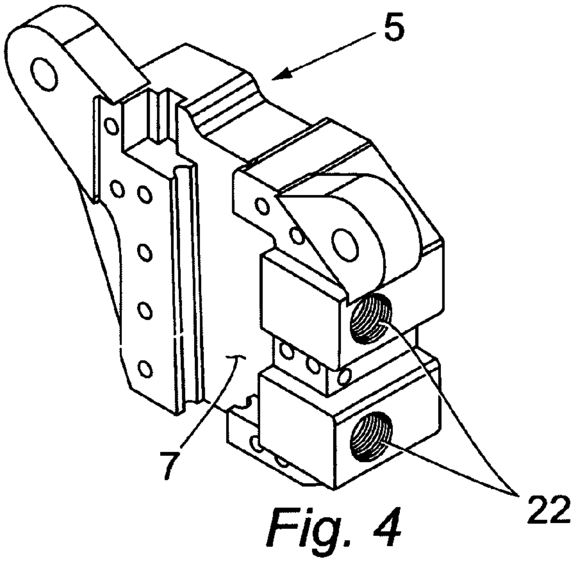
FIG. 4 shows a perspective view from the other side of the FIG. 3 casing.
Figure 5:
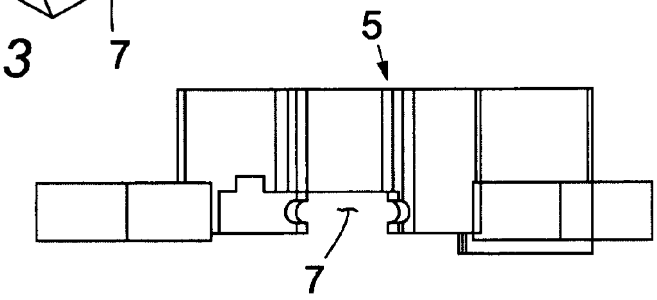
FIG. 5 shows a plan view of the FIG. 3 casing.
Figure 6:
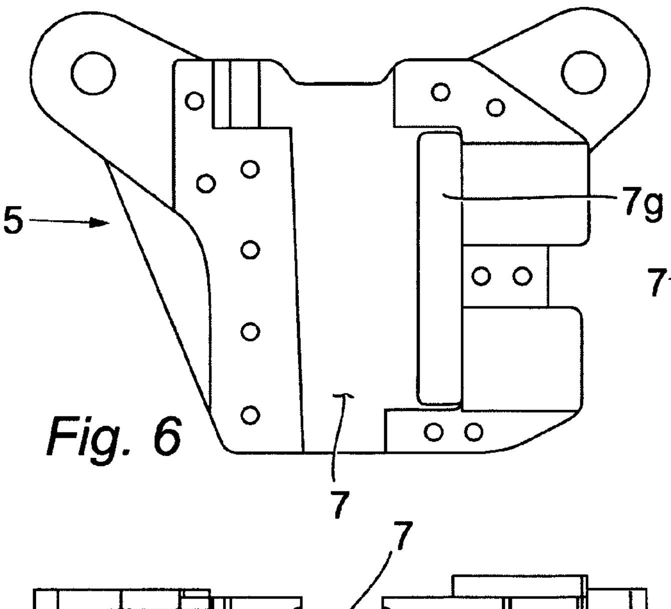
FIG. 6 shows a front view of the FIG. 3 casing.
Figure 7:
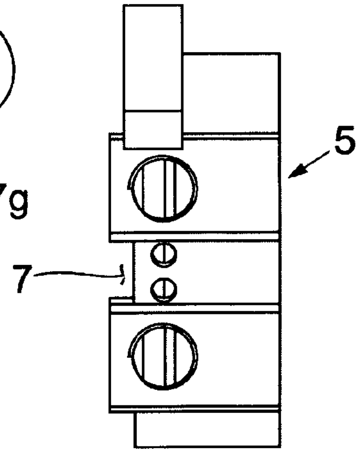
FIG. 7 shows a side view of the FIG. 3 casing.
Figure 8:
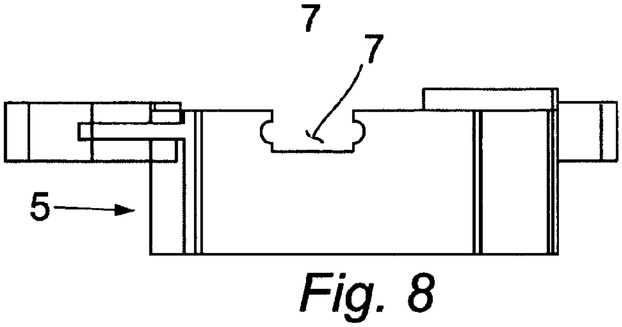
FIG. 8 shows a view from beneath the FIG. 3 casing.

Referring now to the drawings, FIG. 1 shows an exploded view of a clamp having a casing 5 with a channel 7 provided in the casing 7, and a pair of wedge members 10 and 11 and a pressing plate 15 adapted to fit within the channel 7. The channel 7 is closed on the front face of the casing 5 by a pair of cover plates 18, 19 held in place by bolts driven into tapped holes on the front face of the casing 5. Thus, the cover plates 18 and 19 hold the wedging members 10 and 11 and the pressing plate 15 in place within the channel 7.

The wedge members 10 and 11 are splined on their outer faces 10*s* and 11*s* to engage within corresponding spline receiving slots 7*s* and 15*s* on the inner surfaces of the channel 7. The splines and slots are useful to prevent twisting movement of the wedge members when force is applied by the clamp.

The pressing plate 15 is urged against the wedge member 11 within the recess by means of bolts 20 faced with bearings 21 that extend through apertures 22 in the sidewall of the casing 5. A groove 7*g* is formed within the rear face of the channel 7 adjacent to the sidewall of the casing 5 to receive a protrusion 15*p* extending from the rear wall of the pressing plate 15. The lateral width of the groove 7*g* is slightly more than the lateral width of the protrusion 15*p*, allowing limited lateral movement of the pressing plate 15 against the rear wall of the casing 5. In normal use, the pressing plate 15 is fully supported by the bolts 20, and the protrusion 15*p* is forced against the radially innermost side of the groove 7*g*, so that the spline-receiving slots are continuous on both sides of the channel 7. The bearings 21 include a cap and a bronze washer facilitate the rotational movement of the bolt 20 when the cap is held stationary against the wedging member 11. This helps to remove the bolts 20 and loosen the clamp if the wedge members 10, 11 are tightly held in the casing 5.

Figure 9:
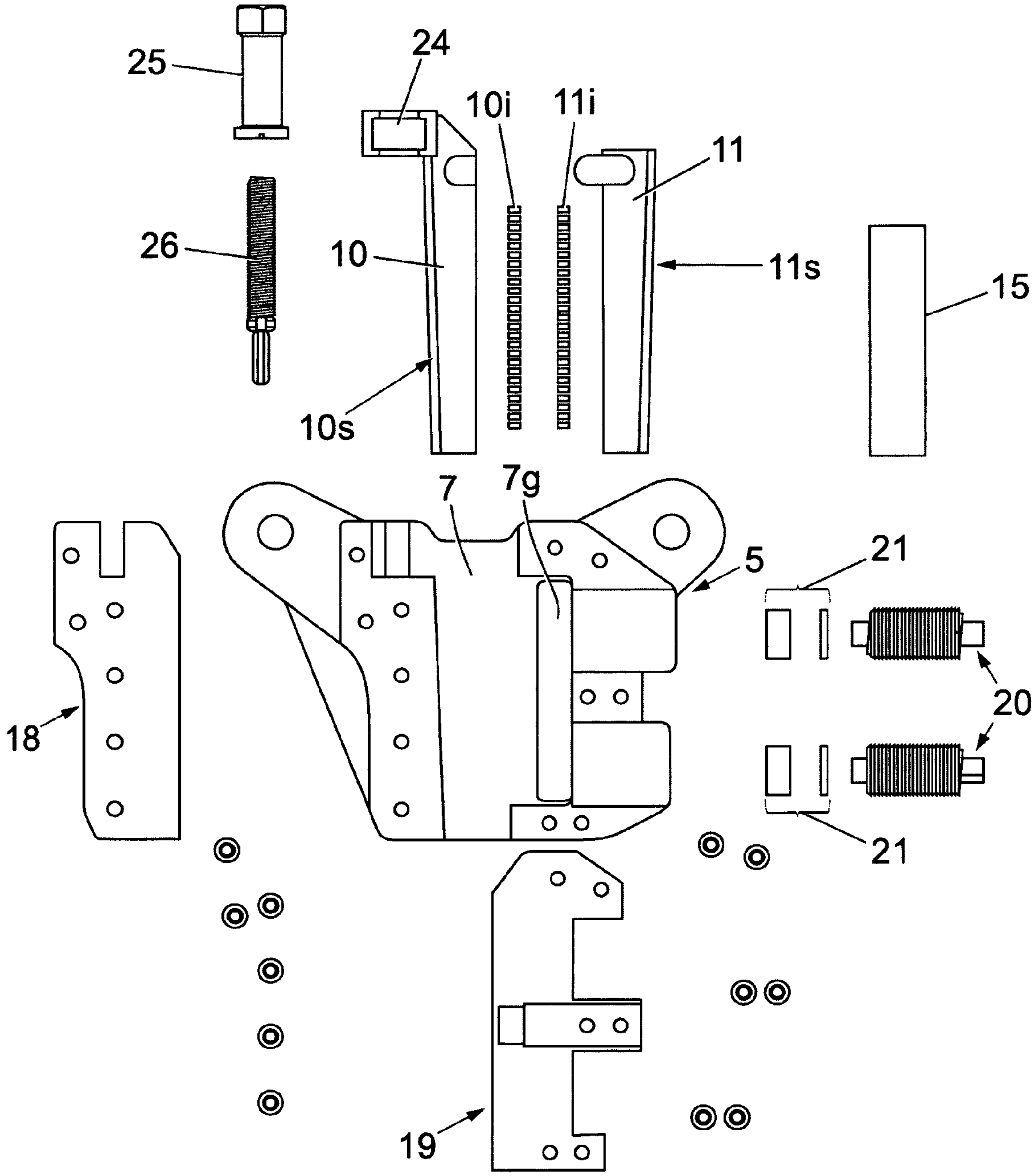
FIG. 9 is an exploded from view of the FIG. 1 clamp.

As best seen in FIG. 9, the walls of the channel 7 are tapered so that the opening at the top is wider than the opening at the bottom. The splined sides 10*s*, 11*s* of the wedge members 10 and 11 are also tapered to match the taper of the inside walls of the channel 7, so that for example, as the wedge member 10 slides down the channel 7, it moves axially and laterally, because of the taper in the channel 7 and the side wall 10*s*.

The wedge members 10 and 11 define between them a line-receiving bore 16 formed by identical hemi-cylindrical channels that match one another to create the cylindrical bore 16. The hemi-cylindrical inner faces of the wedge members that define the bore 16 have an array of recesses 11*r*, 10*r* that extend radially to receive inserts 11*i*, 10*i* that are held within the bore 16 in the assembled clamp. The inserts 11*i* and 10*i* protrude radially inwards into the line receiving bore 16 to form radial ridges therein. The inserts 10*i*, 11*i* can themselves include cut away portions of various shapes to accommodate a line within the bore 16, so that when the line is in the bore 16 in the assembled clamp, it is gripped primarily by the inwardly-protruding ridges of the inserts 10*i*, 11*i*.

In the present example, the line receiving bore 16 is straight.

In operation, the pressing plate 15 is fitted into the channel 7 with the protrusion 15*p* extending into the groove 7*g*. The cover plates 18 and 19 are then bolted onto the front face of the casing 5, so as to cover a portion of the front face of the channel 7, and to retain the pressing plate 15 therein. The bolts 20 are then offered to the holes 22 and tightened, so that the bearings 21 press against the radially outer surface of the pressing plate 15*p*, and urge the pressing plate 15 towards the central axis of the channel 7. When the protrusion 15*p* is forced against the radially inner wall of the groove 7*g*, the spline-receiving slot of the inner face 15*s* is aligned with the upper and lower parts of the slot on the side of the channel 7. The walls 7*s* and 15*s* of the channel 7 are tapered from top to bottom, with a wider opening at the top of the clamp than at the bottom. Typically the taper is very slight, and suitable values for the taper are around 1-5° with respect to the vertical, but other tapers can be used. In certain examples the taper is 1.75°.

When the casing 5 has been assembled, and the wedge members 10 and 11 have been fitted with the inserts 10*i*, 11*i*, the wedge members 10 and 11 are assembled around the line L, so that the ridges formed by the radially-protruding inserts 10*i*, 11*i* engage the outer surface of the line L within the bore 16. Optionally, a lug 11*l* on the front face of the wedge member 11 engages within a recess 10*m* on the front face of the wedge member 10. The assembled wedge members 10, 11 holding the line L within the bore 16 are then slid down into the channel 7, keeping the splines 10*s* and 11*s* engaged within the slots on the side walls 7*s* and 15*s* of the channel 7. As the width of the channel 7 gradually decreases towards the lower end of the casing 5, the wedge members 10 and 11 are forced radially together, thereby forcing the ridges against the line L, gripping the line L between them, and typically slightly deforming the ridges of the plastic inserts 10*i*, 11*i* in preference to the crushing or bruising the line L.

The radial gripping force applied to the line can be applied naturally as the line L passes down through the bore 16, having the effect of drawing the wedge members 10, 11 down into the channel by means of friction. However, additional force can optionally be applied by a fixing 25 engaged within a socket 24 on the wedge member 10 which can be drawn down against the casing by means of a threaded bolt 26 passing through the casing 5 and into a socket on the fixing 25, thereby forcing the wedge members 10, 11 deeper into the tapered channel 7, and therefore forcing them laterally against one another in order to grip the line L more securely. The screw threaded arrangement of the fixing 24, bolt 26 and socket 24 can be replaced by a hydraulic ram, or an air ram, or by any other suitable means for applying axial force to the wedge members 10 and 11 in order to force them further down into the tapered channel 7.

Figure 10:
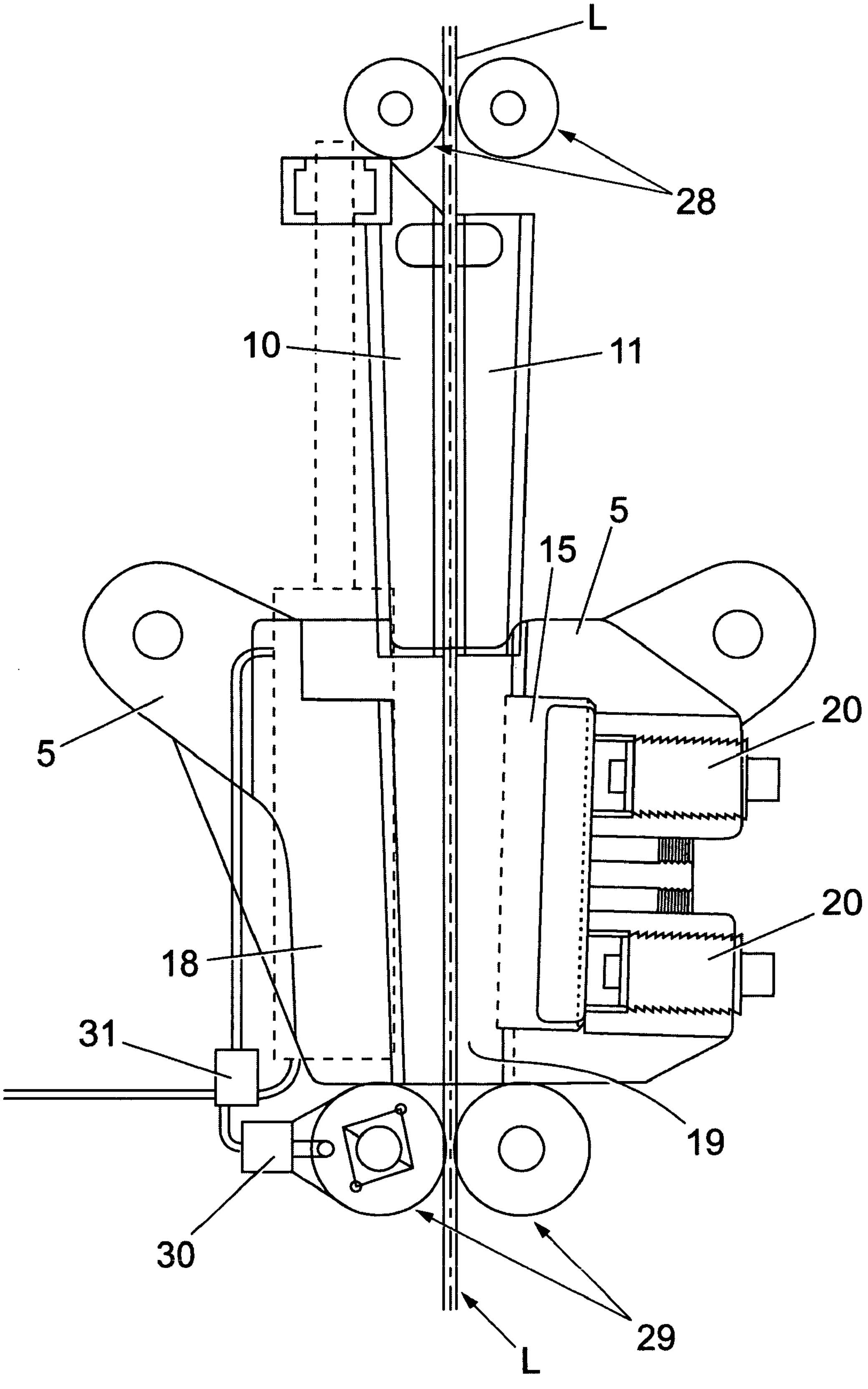
FIG. 10 is a front view of the FIG. 1 clamp with the wedge members removed and the line in place.
Figures 11, 12, 13, 14, 15, 16, 17, 18, 19, 20, 21:
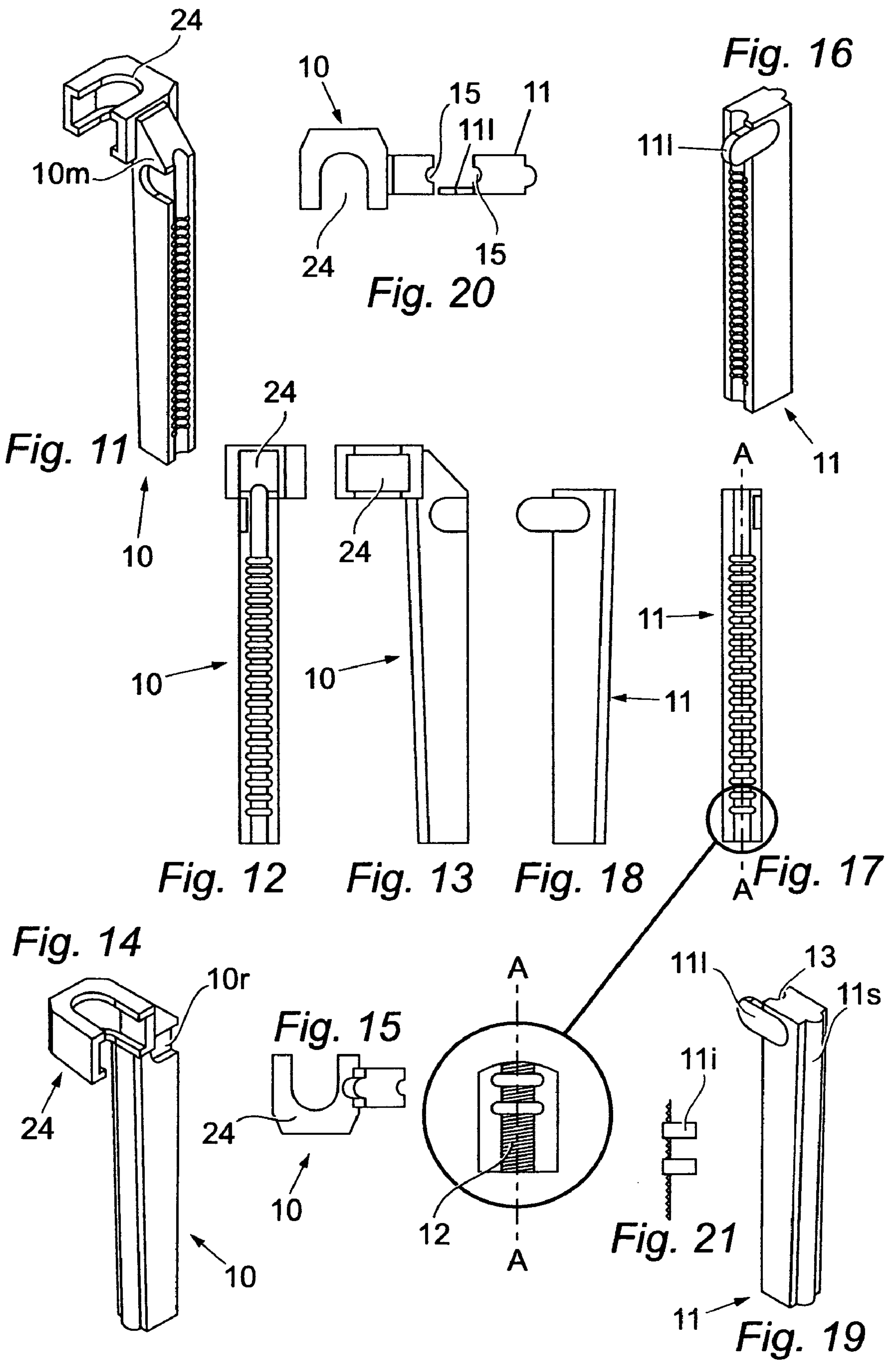
FIG. 11 is a perspective view of a first embodiment of a wedge member.
FIG. 12 is a side view of the FIG. 11 wedge member.
FIG. 13 is a front view of the FIG. 11 wedge member.
FIG. 14 is a further perspective view of the FIG. 11 wedge member.
FIG. 15 is a plan view of the FIG. 11 wedge member.
FIG. 16 is a perspective view of the other wedge member of the first embodiment.
FIG. 17 is a side view of the FIG. 16 wedge member.
FIG. 18 is a front view of the FIG. 16 wedge member.
FIG. 19 is a further perspective view of the FIG. 16 wedge member.
FIG. 20 is a top view of the first and second wedge members.
FIG. 21 is a sectional view on the line AA in FIG. 17.
Figures 22, 23, 24, 25, 26, 27, 28:
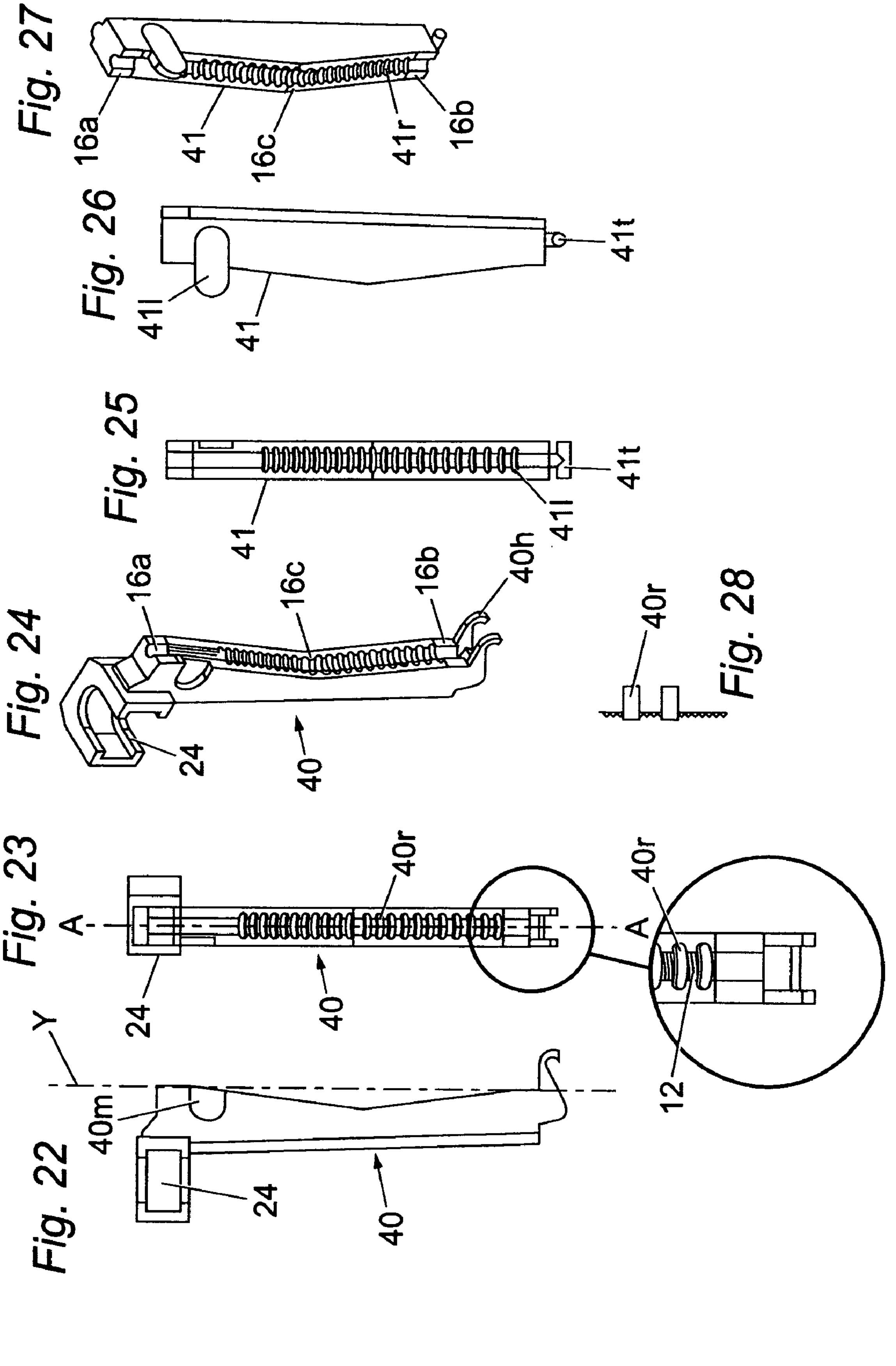
FIG. 22 is a front view of a second embodiment of a wedge member.
FIG. 23 is a side view of the same wedge member.
FIG. 24 is a perspective view of the same wedge member.
FIG. 25 is a side view of a second wedge member of the second embodiment.
FIG. 26 is a front view of the same wedge member.
FIG. 27 is a perspective view of the same wedge member.
FIG. 28 is a sectional view through line AA of FIG. 23.
Figure 34:
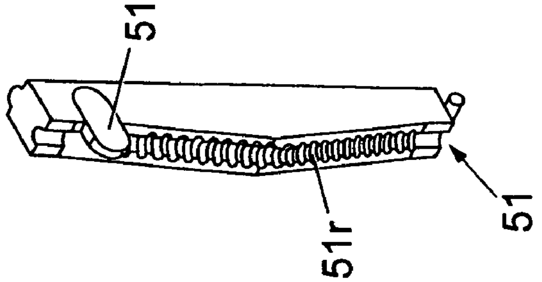
FIG. 34 shows a perspective view of the same wedge member.
Figure 33:
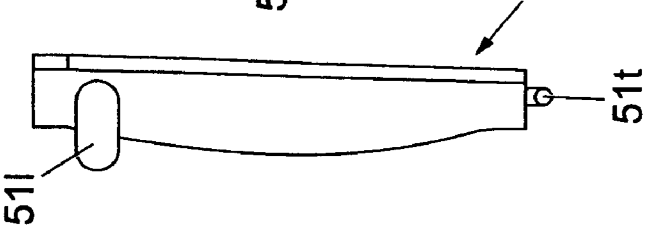
FIG. 33 shows a front view of the same wedge member.
Figure 32:
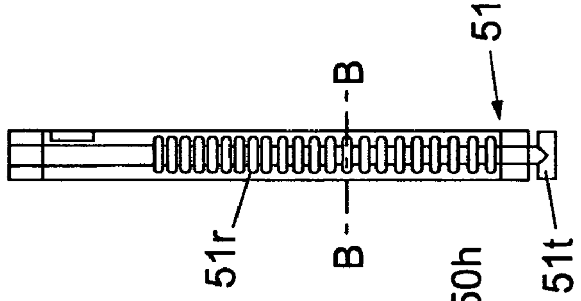
FIG. 32 shows a side view of the other wedge member of the third embodiment.
Figure 31:
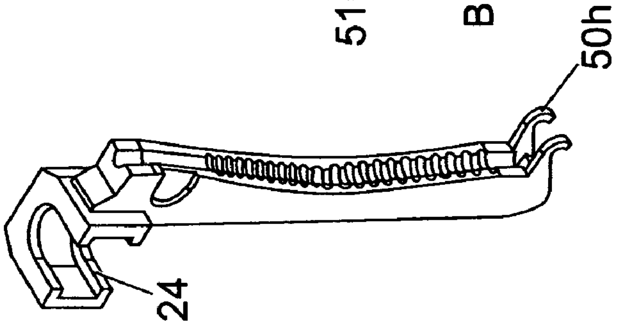
FIG. 31 shows a perspective view of the same wedge member.
Figure 30:
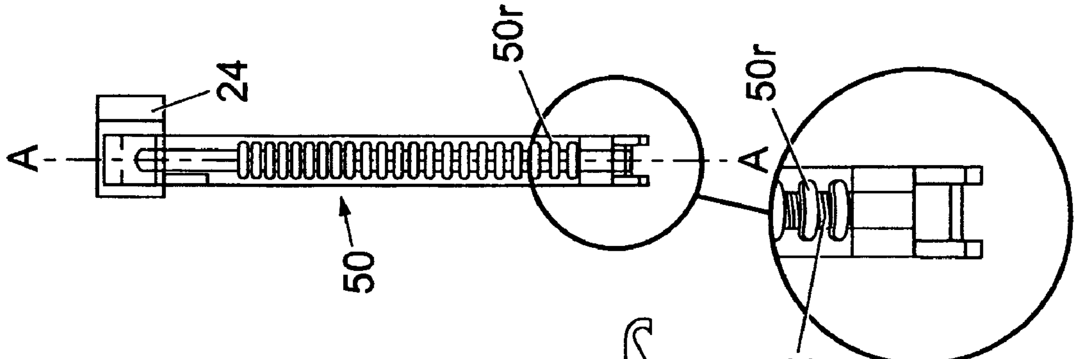
FIG. 30 shows a side view of the same wedge member.
Figure 29:
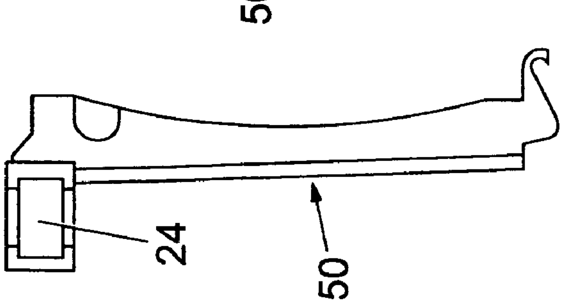
FIG. 29 shows a front view of a third embodiment of a wedge member.
Figure 35:
FIG. 35 shows a sectional view through the line AA of FIG. 30.

In the embodiment shown in FIG. 10, the clamp has a pair of rollers 28, 29 at the top and bottom of the casing, biased toward each other to press against the line L as it enters or leaves the casing. The rollers 28, 29 measure the direction of movement, and optionally the speed of the line L, as it passes the rollers.

In certain embodiments, the rollers can be omitted, and in some embodiments, a bush can be used instead. The bush can be longitudinally split along its central longitudinal bore to accommodate the line L, and can be flanged and chamfered if desired to ease passage of the line through the bore. Typically the bush has a top hat shape with a top flange and a lower sleeve.

The sensor measuring the speed of the line L through the clamp can be electronic, but in this example, there is a simple centrifugal arm (not shown) to trigger a switch 30 and open an air valve 31 to connect a source of pressurised gas with an air ram (shown in broken outline) mounted in the casing to pull the wedge members 10 down into the channel thereby forcing them laterally against one another to grip the line L in the bore 16. The switch can be set to trigger the air ram at a present speed indicative of slippage of the line L through the bore 16 at a rate consistent with breakage of the line L above the clamp. Thus, the clamp can be used in a "pass-through" mode with the wedge members 10, 11 allowing the line L to pass through the bore 16 without being gripped, but permitting instantaneous activation of the clamp to secure the line L against loss down the hole above a set speed threshold through the casing 5. Naturally, the clamp allows free passage of the line upwards through the casing, as the wedges are pulled upwards to the wide end of the channel, and are free to move apart to allow free movement of the line L.

Figure 39:
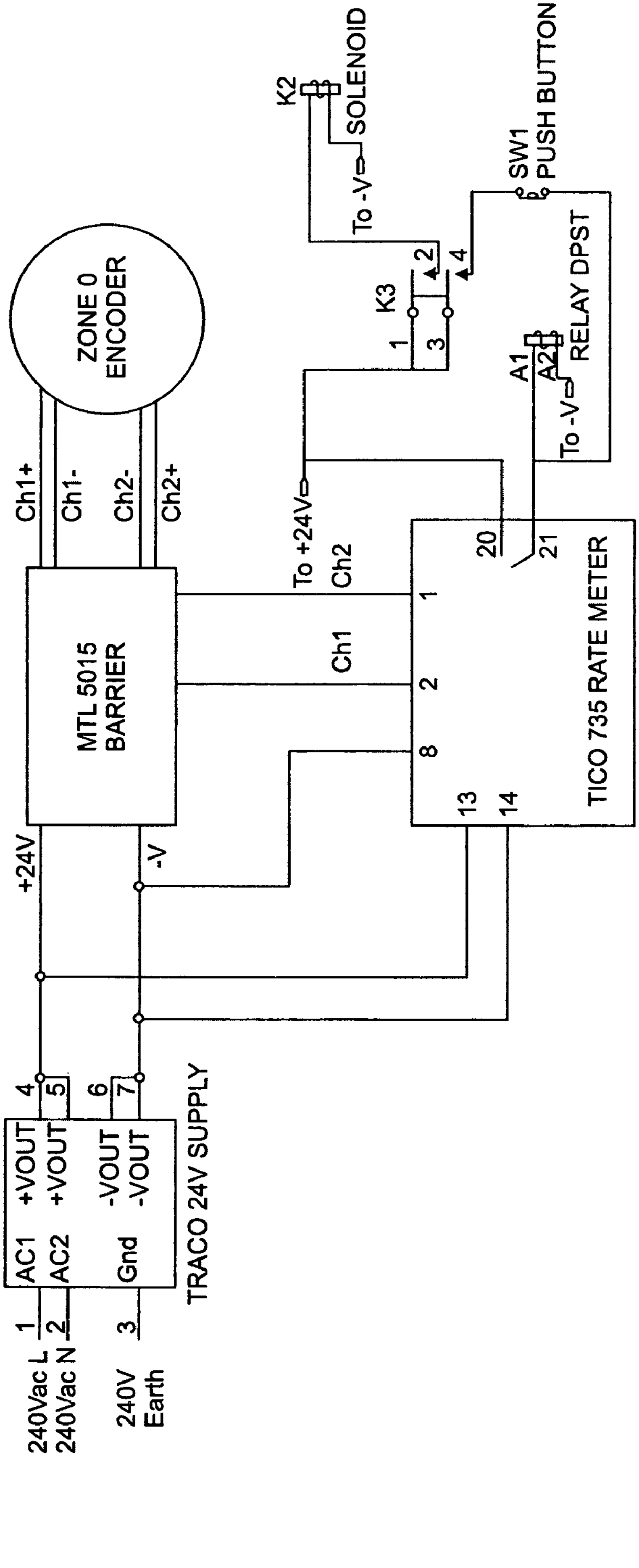
FIG. 39 shows a schematic view of a wiring diagram for an automatic actuation mechanism for a clamp of the invention.

In a further embodiment shown schematically in FIG. 39, the switch 30 is an electronic switch connected to an encoder that measures the speed, and optionally the acceleration or the direction of movement, of at least one of roller 29 or of another jockey wheel that is pressed against the line L and which revolves in accordance with the movement of the line L. High-speed sudden movement of the line L, particularly in a downward direction, might indicate a breakage of the line above the clamp. In that situation, the encoder connected to the axle of the roller or jockey wheel is set to switch the valve 31 at a preset speed and/or direction, for example, 150 m/s in a downwards direction, which is typically designated as a fast fall of the wire indicative of line breakage. Alternatively the encoder can be set to monitor acceleration and to trigger the switch above a given value of acceleration that is indicative of breakage of the line. The encoder can be programmed to avoid triggering the valve 31 in the event of upward movement of the line, and in some embodiments, the encoder can be temporarily set to a higher value when recovering or paying out line in a safe environment, or bypassed altogether by user intervention. The switch typically controls a pressure line open to the main rig pressure system of 120 psi, which can, upon triggering of the switch, be exposed to the pneumatic piston that is connected between the wedges and the body of the clamp. The piston can be actuated by the exposure to the rig pressure system when the switch is triggered by the encoder, and this can instantaneously close the wedges around the line to prevent further movement through the clamp body. The piston can comprise a pneumatic arm arranged to drive the wedge members axially downwards with respect to the tapering channel, so that they are driven laterally towards one another by the corresponding taper.

While the bore 16 may be straight as shown in the embodiment of FIGS. 1-21, it may also incorporate a bend or arc, or otherwise have one or more portions of the central section of the bore displaced from the axis connecting the end portions. FIGS. 22-27 show such an example, in which the radially innermost sides of the wedge members 10 and 11 that together form the bore 16 in the assembled device are formed by two end portions 16*a* and 16*b*, which are disposed at an angle of around 5-15° to the vertical axis Y, and which meet at an apex 16*c* in the mid point of the bore 16, so that the bore 16 is in the form of a dog leg with a central bend. The central apex increases the gripping force applied to the line L and reduces the tendency of the line L to pull out of the bore when clamped.

A similar embodiment is shown in FIGS. 29-35, in which the bore 16 is in the form of a regular arc. The arc radius is typically in the range that is consistent with the bend radius of the line being used, e.g. 100-350 mm. This reduces the tendency of the line L to pull out of the bore, and spreads the additional load across the bore thereby reducing the tendency of damage to the line L by kinking at discrete bend sites. Diverting the bore away from the axis also enables a longer bore for a given length of casing, and the added surface area of wedge members in contact with the line L improves the gripping force without sacrificing length and weight of the clamp.

Any of the above embodiments can optionally have teeth 12 or other formations cut on the inner surface of the bore 16, in between the recesses that hold the inserts 10*i*, 11*i*. This is especially useful if the clamp is to be used for intentional breaking of the line L after a tool string has become stuck, because the force on the wedge members 10 and 11 can be increased beyond the initial point when the line L is being gripped by the soft ridges, to compress the ridges against the harder body of the wedge members, so that the line L is pressed against the teeth and the inserts 10*i*, 11*i* are pressed flat within the bore 16. Forcing the line L against the relatively incompressible teeth on the wedge member, as opposed to the relatively soft insert 10*i*, 11*i*, means that a much higher force can be applied to the line L by the teeth 12 than by the inserts 10*i*, 11*i*. Thus, a single clamp can be used to gently handle fragile wireline with signal and power cables in the cores, and to deform the inserts 10*i*, 11*i* in preference to the fragile wireline cable, but if the cable becomes stuck fast, and must be broken, the same clamp (on the same run) can be tightened up by pulling down on at least one of the wedging members 10, 11, to grip with the relatively incompressible teeth instead of the softer inserts 10*i*, 11*i*, and thereby apply very high loads to the line L to break it. This facilitates a two stage operation with a single clamp, and is a significant advantage.

Naturally, embodiments can be devised that have only teeth (without ridges or inserts) or only ridges (with no teeth between the ridges). Typically, the wedge members are made of metal or some other hard and relatively incompressible material. The inserts 10*i*, 11*i* can be made from nylon, urethane, or other deformable plastics materials.

Figure 36:
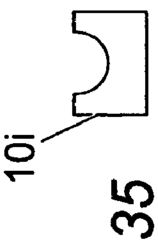
FIGS. 36 to 38 show sectional views through different embodiments of wedge member, on the line BB through FIG. 32.
Figure 37:
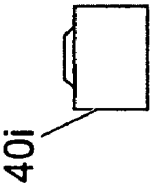
Figure 38:
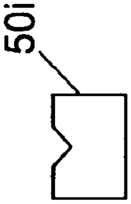

FIGS. 36-38 show different forms of inserted to be accommodated within the recesses in the wedge members. Any of the inserts shown may be suitable for any of the insert-receiving recesses, e.g. 10*r*, 11*r*, 40*r*, 41*r*, 50*r*, 51*r*, and, of course, different forms of insert can be devised without departing from the scope of the invention.

Insert 10*i* has a cross section with a semi-circular cutaway channel for the line L. Insert 40*i* is a solid steel insert with a protrusion of relatively compressible material rather than a cutaway, and is useful for slickline or for single strand wire. Insert 50*i* has a v-shaped cutaway, which might be more useful for lines with rectilinear cross sections. Other shapes and configurations of insert can be devised to match the most surface area of the insert with the outer surface of the line being used at the time.

Modifications and improvements can be incorporated without departing from the scope of the invention.

Following from the above description and invention summaries, it should be apparent to those of ordinary skill in the art that, while the methods and apparatuses herein described constitute exemplary embodiments of the present invention, the invention contained herein is not limited to this precise embodiment and that changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A clamp for an oil well line, the clamp having a casing, a line-receiving bore, and at least one wedge member, the wedge member having a first radially inner surface facing the line-receiving bore, and a second radially outer surface facing the casing, the wedge member being movable within a channel in the casing to grip the line when axial force is applied to the line, wherein one wall of the channel is movable radially outwards away from the line-receiving bore to selectively disengage from the outer surface of the at least one wedge member.

2. A clamp as claimed in claim 1, wherein the wedge member has a first side that is tapered to match a side of the channel, causing lateral movement of the wedge member when it is axially moved within the channel.

3. A clamp as claimed in claim 1, wherein only one wedge member is provided, which slides in a tapered channel to move laterally against one side of the channel thereby gripping the line between the wedge member and the channel side.

4. A clamp as claimed in claim 1, wherein at least two wedge members are provided.

5. A clamp as claimed in claim 4, wherein the wedge members define a line-receiving portion between them, and wherein the wedge members are radially movable relative to one another.

6. A clamp as claimed in claim 4, wherein the wedge members have outer faces that are shaped to match the taper of the channel in the casing.

7. A clamp as claimed in claim 4, wherein the wedge members are movable axially in the tapered channel and are pressed together by the tapered sides of the channel.

8. A clamp as claimed in claim 4, wherein the line is gripped in a line-receiving recess formed between the wedge members.

9. A clamp as claimed in claim 8, wherein the line receiving recess is straight.

10. A clamp as claimed in claim 8, wherein the line receiving recess is not straight.

11. A clamp as claimed in claim 10, wherein the casing has an axis and wherein a central section of the line receiving recess is displaced from the axis.

12. A clamp as claimed in claim 11, wherein the recess is in a form selected from the group comprising an arc and a dog leg.

13. A clamp as claimed in claim 8, wherein the walls of the recess are lined with a material that is different from the material of the wedge members.

14. A clamp as claimed in claim 13, wherein the lining is formed from a softer material than the material of the wedge members.

15. A clamp as claimed in claim 14, wherein the lining is continuous along the recess.

16. A clamp as claimed in claim 14, wherein the lining is continuous along the recess.

17. A clamp as claimed in claim 13, wherein the lining is formed from a material that has a different frictional coefficient than the material of the wedge members.

18. A clamp as claimed in any one of claims 13-17, wherein the lining is continuous along the recess.

19. A clamp as claimed in claim 13, wherein the lining is intermittent along the recess.

20. A clamp as claimed in claim 13, wherein the lining is thicker at one end of the recess than at the other end.

21. A clamp as claimed in claim 13, wherein the lining has different properties at different ends of the recess.

22. A clamp as claimed in claim 8, wherein the walls of the recess have ridges to grip the line.

23. A clamp as claimed in claim 22, wherein the ridges are disposed on the inner surface of the recess in a pattern, and wherein the pattern of ridges is different at different ends of the recess.

24. A clamp as claimed in 22, wherein the ridges are formed from a material with a higher coefficient of friction than the wedge members.

25. A clamp as claimed in claim 22, wherein the ridges are softer than the wedge members.

26. A clamp as claimed in claim 22, wherein the ridges are mounted in ridge-receiving recesses in the wedge members and project radially from the inner walls of the line-receiving recess.

27. A clamp as claimed in claim 22, wherein the spacing between adjacent ridges in the line-receiving recess can be different at different parts of the recess.

28. A clamp as claimed in claim 22, wherein the ridges are spaced closer together at the top of the recess than at the bottom, so that there are more ridges at the top of the recess than at the bottom.

29. A clamp as claimed in claim 4, wherein the wedge members are pivotally connected together.

30. A clamp as claimed in claim 4, wherein the wedge members are biased towards one another by means of springs.

31. A clamp as claimed in claim 4, wherein the wedge members are connected such that a reaction force applied to one of the wedge members is applied to the other wedge member.

32. A clamp as claimed in claim 1, having an actuating mechanism to drive movement of at least one wedge member to grip the line, and wherein at least one wedge member is driven within the channel by the actuating mechanism from its first position in which it is disengaged from the line, to a second position, in which it grips the line.

33. A clamp as claimed in claim 32, having a movement detector arranged to determine changes in the velocity of the line through the clamp, and wherein the actuating mechanism is activated automatically by the movement detector in accordance with changes in the velocity of the line through the clamp.

34. A clamp as clamed in claim 1, wherein at least one wedge member is keyed to the casing to restrain movement that is not axial or lateral.

35. A clamp as claimed in claim 1, wherein the casing has a slot to permit passage of the line through the slot to be gripped by the wedge member without disassembly of the clamp.

36. A clamp as claimed in claim 1, wherein the wedge member is held spaced apart from the line prior to actuation of the clamp.

37. A clamp for an oil well line, the clamp having a casing, and at least one wedge member, the wedge member being movable within a channel in the casing to grip the line when axial force is applied to the line, wherein one wall of the channel is movable to selectively disengage from the at least one wedge member, wherein the movable wall is supported by threaded members adjustable to back the movable wall away from the line, thereby allowing lateral movement of the at least one wedge member away from the line without any axial component of movement.

* * * * *